United States Patent [19]

Fitzgerald

[11] 4,168,298

[45] Sep. 18, 1979

[54] YARN CONSISTING OF DRAWN SINTERED PTF FIBERS AND WOVEN, NON-WOVEN AND KNITTED FABRICS; FILTER BAGS; ROPES; AND FIRE-PROTECTIVE CLOTHING FORMED THEREFROM

[75] Inventor: Emerson B. Fitzgerald, Wilmington, Del.

[73] Assignee: E. I. Du Pont de Nemours and Company, Wilmington, Del.

[21] Appl. No.: 827,596

[22] Filed: Aug. 25, 1977

Related U.S. Application Data

[62] Division of Ser. No. 615,723, Sep. 22, 1975, Pat. No. 4,064,214.

[51] Int. Cl.$^2$ .................. B32B 27/02; B32B 27/28; D02G 3/02
[52] U.S. Cl. ............................... 428/224; 28/104; 28/107; 57/206; 57/208; 57/209; 66/202; 139/420 R; 210/500 R; 428/225; 428/229; 428/362; 428/422; 428/920
[58] Field of Search ............... 428/229, 225, 224, 362, 428/422, 920; 57/140 S, 206, 208, 209; 139/420 R; 66/202; 210/500 R; 28/104, 107

[56] References Cited

U.S. PATENT DOCUMENTS

| | | | |
|---|---|---|---|
| 2,559,750 | 7/1951 | Berry | 428/422 |
| 2,772,444 | 12/1956 | Burrows et al. | 428/422 |
| 3,549,470 | 12/1970 | Greenwald et al. | 428/422 |
| 4,025,679 | 5/1977 | Denny | 428/422 |

Primary Examiner—J. C. Cannon

[57] ABSTRACT

A process for forming polytetrafluoroethylene yarn by
(1) forming an oriented polytetrafluoroethylene film by drawing a sintered sheet from about 5 to 30 times its original length at an elevated temperature; and
(2) passing the oriented film through fibrillating means such as a high turbulent air velocity jet to form a yarn of entangled irregular shaped non-uniform staple fibrils.

The yarn and woven, non-woven and knitted fabrics prepared from this yarn also are part of the invention.

10 Claims, No Drawings

YARN CONSISTING OF DRAWN SINTERED PTF FIBERS AND WOVEN, NON-WOVEN AND KNITTED FABRICS; FILTER BAGS; ROPES; AND FIRE-PROTECTIVE CLOTHING FORMED THEREFROM

CROSS REFERENCE TO RELATED APPLICATIONS

This application is a divisional application of copending application Ser. No. 615,723 filed Sept. 22, 1975 now U.S. Pat. No. 4,064,214 issued Dec. 20, 1977.

BACKGROUND OF THE INVENTION

This invention is related to a process for making yarn, and in particular, to a process for making polytetrafluoroethylene yarn.

Fibers of polytetrafluoroethylene have been produced by slitting a polytetrafluoroethylene film into thin structures and then expanding and orienting these structures as shown in Gore U.S. Pat. No. 3,664,915, issued May 23, 1972. Also, continuous fibers of polytetrafluoroethylene have been prepared by blending viscose with a polytetrafluoroethylene dispersion and then extruding a filament and heating the filament to sinter the polytetrafluoroethylene and remove the viscose but this provides a dark brown fiber. To bleach the fiber, the fiber subsequently is passed through a nitric acid bath.

Neither of these processes form a polytetrafluoroethylene fiber which when made into a fabric will form high quality filters such as those used in electric power plants to remove ash from hot flue gas from boilers or those utilized by the chemical industry to filter hot corrosive liquids and gases.

SUMMARY OF THE INVENTION

The process for forming a polytetrafluoroethylene yarn comprises
(1) forming an oriented polytetrafluoroethylene film by drawing a sintered polytetrafluoroethylene sheet at a temperature of 340°–400° C. from about 5 to 30 times its original length; and
(2) passing the oriented film through a fibrillating means thereby forming a yarn of entangled irregularly shaped non-uniform staple fibrils.

A yarn of entangled irregular shaped stable fibrils of oriented polytetrafluoroethylene also is part of this invention as are fabrics such as woven fabrics, non-woven fabrics and knitted fabrics prepared from this yarn.

DESCRIPTION OF THE INVENTION

The polytetrafluoroethylene yarn of this invention when formed into a fabric makes a high quality and efficient filter that can be used, for example, to remove up to 99% of the particles in high temperature flue gases from furnaces and boilers and to filter hot corrosive chemical liquids and gases. The process of this invention for preparing these yarns is economical and efficient and provides a high quality yarn.

The polytetrafluoroethylene used in the process can be extruded from a billet onto heated drawing rolls that sinter and orient the film. The polytetrafluoroethylene billet can be prepared by blending powdered polytetrafluoroethylene with about 15–25% of a hydrocarbon lubricant such as naphtha to form a paste. This paste is compressed into a billet and the billet is placed in a piston type extruder which extrudes a film in continuous ribbon or bead onto calender rolls that form a film about 2–10 mils thick and from about 0.5–3 inches in width. The film is then passed into a drying oven to remove any residual lubricant. The film is slit to its desired width.

Optionally, a polytetrafluoroethylene film can be used as the starting material and slit into a film of the desired width. Also, the film and the billet can be pigmented with various heat stable pigments to provide a colored yarn.

The polytetrafluoroethylene film must be sintered. This can be done immediately after the film is slit, or before the film is slit, by passing the film over a separate set of heated rolls. To sinter the polytetrafluoroethylene, the film is heated to about 340°–400° C. Sintering of the film also may be done just before the film is drawn and oriented. This can be accomplished by passing the film over heated rolls or a heated plate. Optionally, a sintered polytetrafluoroethylene film can be used as the starting material.

Once the film has been sintered, it is drawn and oriented to about 5 to 30 times its original length. For most uses, the film is drawn about 10–20 times. Drawing and orienting of the film is accomplished by conventional techniques. The film is passed over heated drawing rolls or a heated plate and the film is heated to about 340°–400° C. Generally, the film is heated to about 350°–370° C. The procedure used to draw the film is to pass the film around wind-up rolls that travel at a speed greater than the rolls which are unwinding the film. The speed ratio of the unwind and wind-up rolls can be adjusted to give the above draw. This is a conventional technique well known to those skilled in the art.

The resulting drawn and oriented polytetrafluoroethylene film has a tensile strength of about 50,000 to 100,000 pounds per square inch.

The drawn and oriented film is passed into a fibrillating means and formed into a yarn. The yarn is of entangled irregularly shaped non-uniform staple fibrils of polytetrafluoroethylene and is of about 100–2000 denier and has a tenacity of at least 1.0 grams per denier. Generally, the yarn has a denier of about 400–1000 and a tenacity of 2.0–6.0 grams per denier.

The fibrillation means used to prepare the yarn can be those conventionally used in the art. One preferred apparatus which gives a high quality yarn is a jet through which a high velocity turbulent fluid is impinged upon the film which causes the film to fibrillate and a yarn as described above is formed. Generally, air is used as the fluid, however, other gases or liquids also could be used.

The yarn can be twisted to improve strength and resilience. Generally, about 1 to 5 twists per inch can be used.

The yarn can be processed into fabrics using conventional equipment and techniques. For example, the yarn can be woven, knitted or non-woven to form a fabric. Typical woven cloths such as twills, drills and ducks can be prepared. Non-woven felts can be formed using conventional mechanical or hydraulic needling. Carded, cross-lapped and needled felts also can be prepared. In general, these fabrics have a good drape, excellent flexibility, a good hand, are dimensionally stable and are easily sewn. These fabrics can be treated, coated or impregnated using conventional techniques to impart additional properties to the fabrics, for example, to improve adhesion of the fabric.

In addition to the use as filters, fabrics of the yarn can be used for fire-proof or protective clothing, pump and valve packing, gasket tape, bearings, conveyor belts, wicking felts, release fabrics, leader tapes and in fuel cells. The yarn can be processed into ropes, sewing threads, electrical lacing cords and the like.

The following Example illustrates the invention. All parts and percentages are by weight unless indicated otherwise.

EXAMPLE

A roll of electrical grade polytetrafluoroethylene tape (made by paste extrudation and is subsequently sintered) ¼ inch wide ×3 mils in thickness is wrapped seven times around a pair of 8 inch diameter feed rolls heated to 220° C. From the feed rolls, the tape then is passed over an electrically heated metal plate about 22 inches in length and heated to about 361° C., and then the tape is wrapped 5 times around a pair of drawing rolls to give a draw of about 17.9 times. A ribbon results having a 547 denier. The ribbon is passed into a fibrillator which is a bulk continuous fiber bulking jet which utilizes 50 pounds per square inch pressure. A yarn is formed that has a tenacity of 2.0 grams/denier and an elongation at break of about 7.6%.

A woven fabric is prepared from the yarn using a conventional loom. The fabric is a 3×1 twill having 59 ends per inch and 50 picks per inch, a weight of 8.4 ounces/square yard and Frazier air permeability of 24 cubic feet per minute per square foot of cloth using a ½ inch water pressure differential across the cloth.

A tubular knit fabric is prepared from the yarn using a Knit de Knit machine. A high quality knit fabric is formed.

A felt is prepared from the yarn. The yarn is cut into 2 inch staple and is carded, cross-lapped and mechanically needled to form a strong felt fabric.

The invention claimed is:

1. A yarn of entangled irregularly shaped non-uniform staple fibrils consisting of sintered oriented polytetrafluoroethylene and having a denier of 100–2000 and a tenacity of at least 1.0 grams per denier and in which the fibrils have been drawn to 5 to 30 times their original length.
2. The yarn of claim 1 having 1 to 5 twists per inch.
3. A knitted fabric prepared from the yarn of claim 1.
4. A rope prepared from the yarn of claim 1.
5. A woven fabric prepared from the yarn of claim 1.
6. A filter bag of the woven fabric of claim 5.
7. Fire protective clothing prepared from the fabric of claim 5.
8. A non-woven fabric prepared from the yarn of claim 1.
9. The non-woven fabric of claim 8 which is prepared by mechanical needling or by hydraulic needling.
10. The non-woven fabric of claim 8 which is prepared by carding, cross-lapping and mechanically needling a batt of yarn.

* * * * *